Nov. 3, 1964  M. GNATT  3,155,000
VISUAL AID-ASSOCIATION IDENTIFICATION DEVICE
Filed July 2, 1962  3 Sheets-Sheet 1

INVENTOR
MOSHE GNATT
BY
ATTORNEY

Nov. 3, 1964  M. GNATT  3,155,000
VISUAL AID-ASSOCIATION IDENTIFICATION DEVICE
Filed July 2, 1962  3 Sheets-Sheet 2
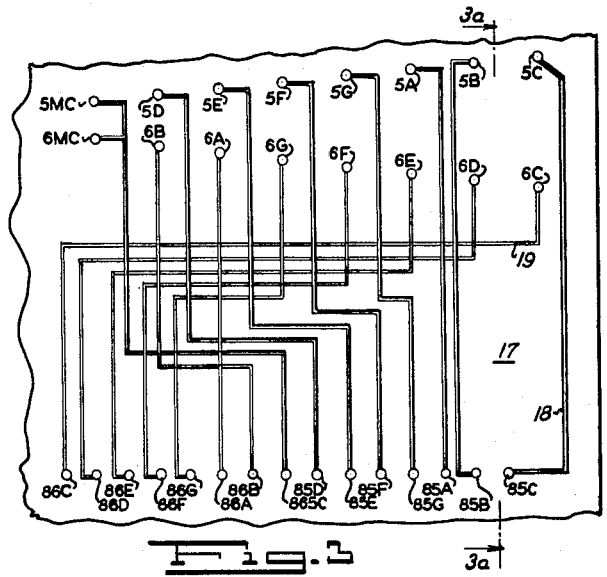
Fig.2
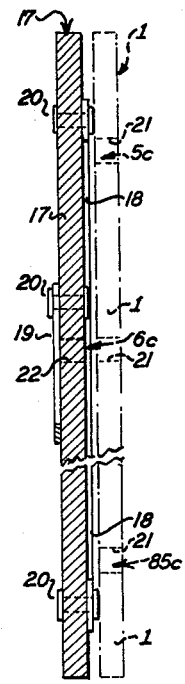
Fig.3a
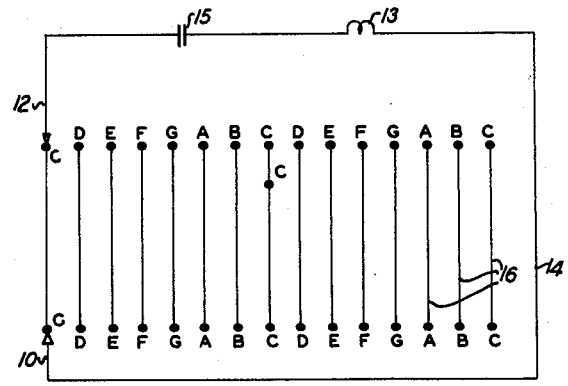
Fig.2
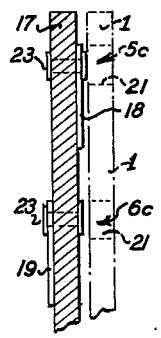
Fig.3b
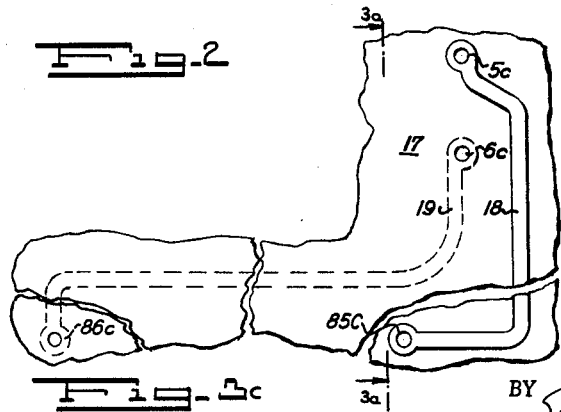
Fig.2c
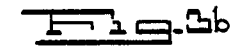
INVENTOR
MOSHE GNATT
BY
ATTORNEYS Nov. 3, 1964    M. GNATT    3,155,000
VISUAL AID-ASSOCIATION IDENTIFICATION DEVICE
Filed July 2, 1962    3 Sheets-Sheet 3
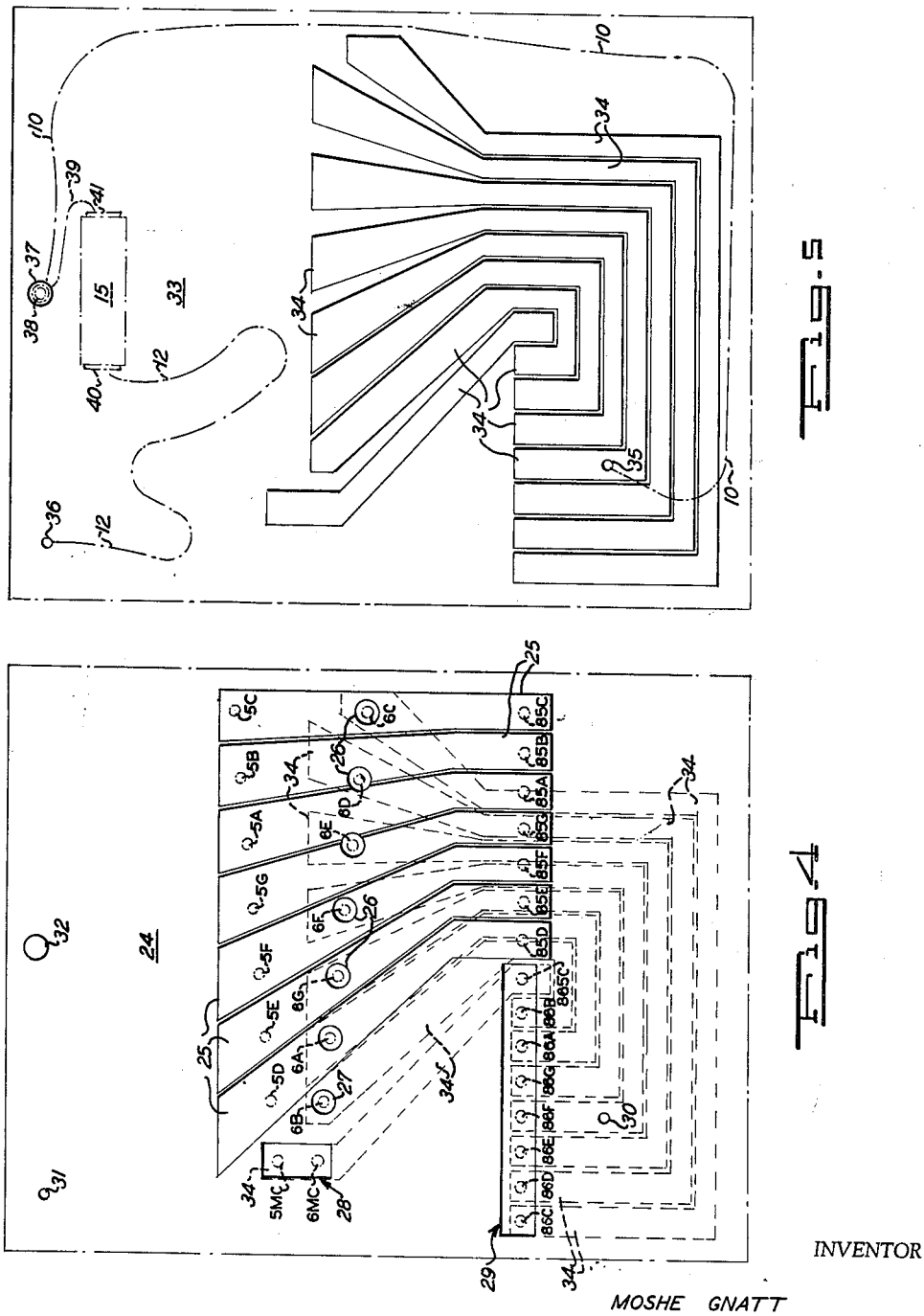
INVENTOR
MOSHE GNATT
BY
ATTORNEYS United States Patent Office 3,155,000
Patented Nov. 3, 1964

3,155,000
VISUAL AID-ASSOCIATION IDENTIFICATION
DEVICE
Moshe Gnatt, 2906 Brighton 12th St., Brooklyn 35, N.Y.
Filed July 2, 1962, Ser. No. 206,745
2 Claims. (Cl. 84—478)

The present invention relates to a visual aid association-identification device, and more particularly to such a device for learning without supervision the fundamental positional correlation between respective notes of a musical staff and corresponding operative means on a musical instrument for achieving such notes when the instrument is played.

Various devices are known for teaching beginners in music the various notes in the musical scale and the operative means on the particular musical instrument which should be used in order to achieve the desired notes. Nevertheless, the known devices usually require the presence of an instructor who leads a class of students in music, and often such devices require the simultaneous use of the actual musical instrument which the beginners are learning to play. Such teaching devices as have been used in the past are complicated in construction and require a comparatively advanced degree of dexterity to operate. These devices are also so large as to render their transport difficult, and considering the fact that an actual musical instrument is almost always necessary for carrying out the desired instruction with the device in question, wide-spread utilization of such devices has not been attained.

It is an object of the present invention to overcome the foregoing drawbacks and to provide a visual-aid association-identification device for learning without supervision the fundamental positional correlation between respective notes of a musical staff and corresponding operative means on a musical instrument for achieving such notes when the instrument is played.

Another object of the present invention is to provide a device of the foregoing type which is simple in construction and durable in use, and which is inexpensive to produce.

It is a further object of the present invention to provide a visual aid association-identification device of the foregoing type which may be used by beginners in the study of music without the need for close supervision and without the need for the actual musical instrument which the beginner is learning to play.

It is a still further object of the present invention to provide a device of the foregoing type which is small, compact, and portable, and which may be operated by the beginning student in music with a minimum of effort, yet with a maximum opportunity for accelerated learning of the subject matter at hand.

It is a still further object of the present invention to provide a visual aid association-identification device of the foregoing type which is especially designed for use by children of the earliest ages, for example those from 3 to 10 years old, in consequence of the simplicity of operations connected with the device of the invention, the light, compact, and portable nature thereof, and the ability of the student to operate the device most anywhere without the need for special auxiliary equipment.

Other and further objects of the present invention will become apparent from a study of the within specification and accompanying drawings in which:

FIG. 1 is a schematic representation of a panel board containing various indicia on its front face including the depiction of a musical grand staff and a portion of a musical instrument, said staff and musical instrument portions being provided with appropriate contact recesses so that the student, by trial and error, may find with the use of a pair of wire leads the counterpart note position on the musical instrument representation which corresponds to the particular note on the musical staff chosen;

FIG. 2 is a schematic view of a circuit scheme which includes an energizable main circuit which is only meant to be closed when the corresponding wire leads are placed across the desired sub-circuit connecting a particular note in the musical staff in the panel board of FIG. 1 with the corresponding piano key of the musical instrument piano keyboard;

FIG. 3 is a schematic view of a wiring diagram of metallic electrically conductive strips secured, as for example by rivets, on to a second board, which may be placed under the panel board of FIG. 1 and in abutting contact therewith, the electrically conductive strips being positioned in an arrangement corresponding to the circuitry shown in FIG. 2;

FIG. 3a is a schematic, enlarged, partial sectional view of a portion of FIG. 3, taken along the line 3a—3a of FIG. 3, which illustrates the positional arrangement of the various sub-circuits, not only with respect to one another in the second board but also with respect to the note positions of the musical staff in the uppermost or first panel board shown in FIG. 1.

FIG. 3b is a schematic, enlarged, partial sectional view corresponding to that of FIG. 3a, in which an alternate embodiment of the means for attaching the metallic electrically conductive strips is shown;

Figure 1:
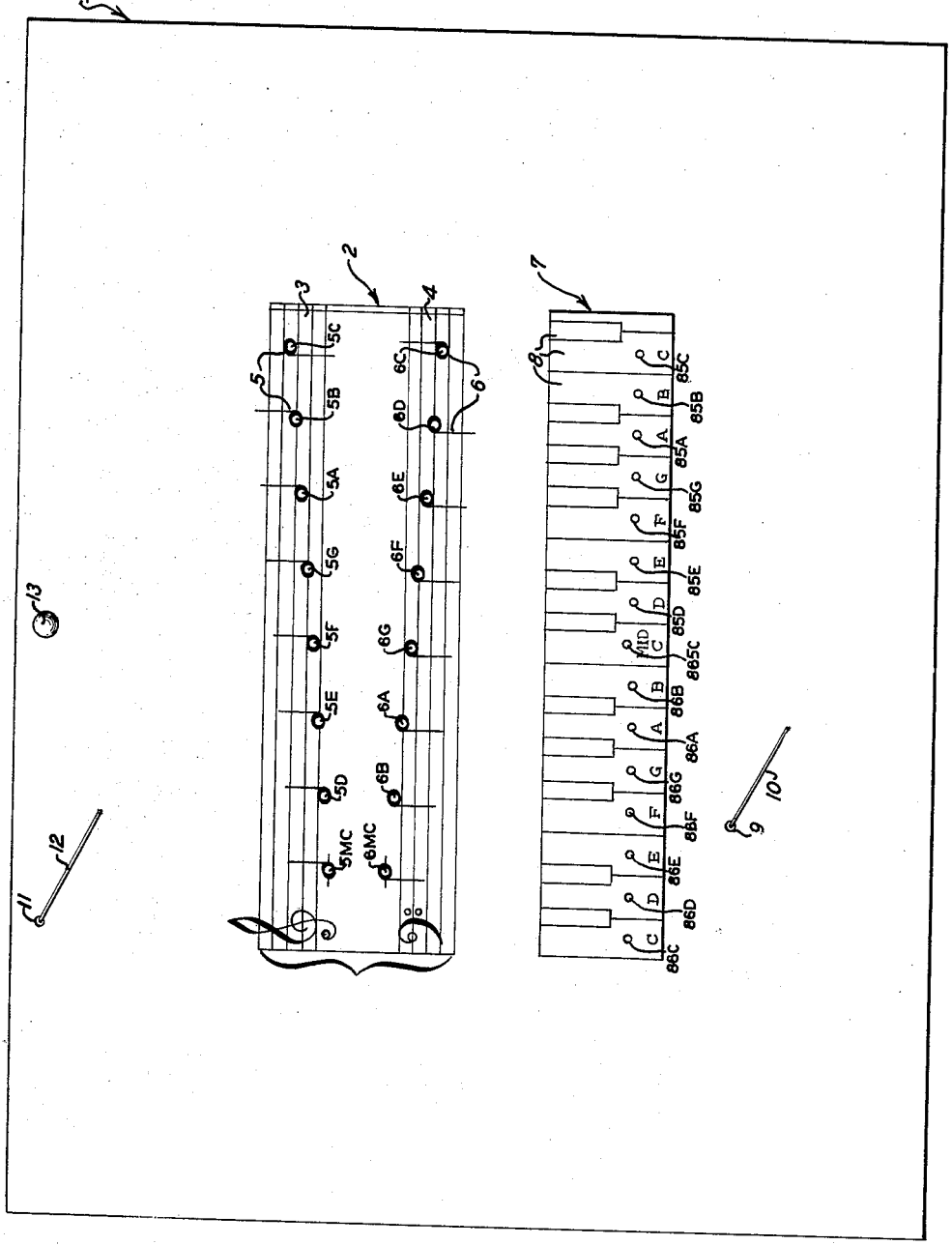

FIG. 3c is a schematic, enlarged, partial view showing in abbrevated form portions of the second board of FIG. 3 and illustrating more clearly the portions in section of FIG. 3a taken along the line 3a—3a, and FIGS. 4 and 5 are schematic views of the sub-circuit arrangement of the device in accordance with an alternate embodiment to that shown in FIG. 3, in which a second board as shown in FIG. 4 and a third board, as shown in FIG. 5, are superimposed and positioned under the panel board of FIG. 1 in abutting relation, the second and third boards of FIGS. 4 and 5 containing metallic foil material defining various sub-circuits corresponding to those shown in FIG. 2.

It has been found in accordance with the present invention that a visual aid association-identification device for learning without supervision the fundamental positional correlation between respective notes of a musical staff and corresponding operative means on a musical instrument for achieving such notes when the instrument is played, may be provided in a simple and durable constructional form which is economical to manufacture and portable in use. The learning device of the present invention generally comprises a panel having a visual representation of a musical staff with individual notes depicted thereon and a visual representation of at least a portion of a musical instrument with simulated individual operative means for achieving such notes depicted thereon, an energizable circuit means containing electrically operable signal means therein and having a pair of leads for closing said circuit means to operate said signal means, a plurality of musical staff contact positions for one of said leads each disposed at a corresponding note and a plurality of musical instrument contact positions for the other of said leads each disposed at a corresponding simulated operative means, as well as a plurality of sub-circuit means each connecting a respective musical staff contact position with the corresponding musical instrument contact position for closing the circuit means to operate said signal means only when said leads are placed at the respective counter-part contact positions of said musical staff and musical instrument connected by the same sub-circuit means.

Preferably, the energization circuit means in the device of the invention is energized by a dry cell and the signal means is in the form of a light bulb, although it will be appreciated that any signal means may be used, such as a buzzer, bell, etc. energized by closing the circuit in question. The dry cell and light bulb may be connected in series in the circuit means, and the leads may be said to define terminal connectors for the circuit means when used to complete a circuit through the appropriate sub-circuit means between a particular note in the musical staff and a musical instrument key position which is the counter part thereof. With respect to the notes depicted on the musical staff and the corresponding key positions in the musical instrument also depicted, appropriate contact positions are defined thereat which may be disposed in corresponding socket recesses located in the panel face.

In accordance with a preferred embodiment of the invention, the panel is in the form of a portable panel board, the leads are manually operable, and the light bulb, as well as the representation of the musical staff with the notes, and the musical instrument with the simulated operative means are all located on the same face of the panel, the circuit means, sub-circuit means, and dry cell being located on the panel board at a point remote from said face.

The circuit means and sub-circuit means in accordance with one feature of the invention are provided as discretely defined sections in an electrically conductive sheet material, while in accordance with an alternate feature of the invention, the circuit means and sub-circuit means are at least partially in the form of electrically conductive pre-stamped metallic foil circuit sections. The circuit means and sub-circuit means may also be formed simply of conductive wire sections.

A most practical application of the device in accordance with the invention is connected with the learning of piano playing. Thus, a portable and compact visual aid identification device for learning without supervision the fundamental positional correlation between respective notes of a musical staff and corresponding keys of a piano for sounding such notes when the piano is played may be provided, especially for use with comparatively young children, i.e. within the age group of 3–10 years. In this embodiment, the panel board contains a visual representation of a musical staff with individual notes depicted thereon on one face of the board and a visual representation of at least a portion of a piano keyboard with simulated individual piano keys for achieving such notes depicted thereon on said same face as well as an energizable circuit means having a light bulb therein, and having also a pair of contact terminal leads for closing the circuit means to illuminate said bulb, said bulb also being located on the face containing the musical staff and keyboard representations. A plurality of musical staff contact positions for one of the leads is provided, each disposed on the aforementioned face at a corresponding note while a plurality of piano key contact positions for the other of said leads is provided, each disposed on said face, at a corresponding simulated piano key. A plurality of sub-circuit means is in turn provided, each connecting a musical staff note contact position with the corresponding piano key contact position for closing the circuit means to illuminate the bulb only when one of the leads is placed at a respective musical staff note contact position and the other of the leads is placed simultaneously at a corresponding counter-part piano key contact position connected by the same sub-circuit means. By providing a suitable dry cell connected in series with the bulb, the circuit means may be duly energized by the leads which may take the form of manually operable wire leads for contacting the appropriate contact positions, the latter being defined advantageously in corresponding socket recesses located on the aforementioned face at the note and piano key positions. Of course, the circuit means, sub-circuit means and the dry cell will be located appropriately out of view on the panel board remote from the front or top face containing the various representations, bulb, and contact positions.

With particular reference to the learning of the piano, the musical staff includes appropriately an upper treble staff portion depicting from left to right in ascending order the respective notes, middle C, D, E, F, G, A, B, and high C, as well as a lower bass staff portion depicting from left to right in descending order the respective notes: middle C, B, A, G, F, E, D, and low C. On the other hand, the piano key board includes analogously a plurality of piano keys depicting from left to right in ordinal sequence by designating indicia the respective counter-part piano scale notes low C, D, E, F, G, A, B, middle C, D, E, F, G, A, B, and high C. Significantly, the contact positions of the piano key scale notes of the sequence low C, D, E, F, G, A, and B are series connected respectively by separate sub-circuit means with the corresponding contact positions of the counter-part lower bass staff notes of the sequence low C, D, E, F, G, A, and B, while the contact positions of the piano key scale notes of the sequence D, E, F, G, A, B, and high C are series connected respectively by separate sub-circuit means with the corresponding contact positions of the counter-part upper treble staff notes of the sequence D, E, F, G, A, B, and high C. Because of the fact that middle C is located on both staff portions, the contact position of the piano key scale note middle C is series connected by a common sub-circuit means with the corresponding contact positions of both the counter-part lower and upper staff notes middle C.

A particularly convenient disposition of the circuit means and sub-circuit means in the panel board described above contemplates discretely forming the circuit sections from metallic foil conductive material disposed in a sheet on the panel board under the top or uppermost face, such material being in the form of a sheet containing score lines therethrough completely conductively separating from one another adjacent conductive portions whereby to define a plurality of discrete conductive sections serving as the circuit means and sub-circuit means. Of course, the sections defining the circuit means and sub-circuit means may take the form of two separate sheets of conductive material in superimposed insulated disposition with respect to one another, said sheets being placed under the top or uppermost panel board portion containing the aforementioned representations thereon, so as to form a multi-layer composite panel board with the various layers bonded, riveted, or laminated together, whereby to form a light, portable, and easily operatable instruction device.

Referring to the drawing, FIG. 1 shows a panel board 1 which may be made from cardboard, art board, or the like, and on which are depicted various representations including a musical grand staff 2 having an upper treble staff portion and a lower bass staff portion, as well as a portion of a piano key board 7 having various keys 8. The upper treble staff portion 3 is provided with a treble clef signature as well as eight notes 5 representing an ascending musical scale, whereas the lower bass staff 4 is provided with a bass clef signature as well as eight notes 6 representing a descending musical scale. The various notes depicted in the musical staff 2 are provided with socket recesses defining contact positions for the wire lead 12, these contact positions being defined in the upper treble staff 3 from left to right as 5MC, 5D, 5E, 5F, 5G, 5A, 5B, and 5C, respectively, and in the lower bass staff 4, from left to right, as socket recess contact positions 6MC, 6B, 6A, 6G, 6F, 6E, 6D, and 6C, respectively.

On the other hand, with respect to the piano keyboard 7, each of the keys 8 is provided with an analogous socket recess contact position designated from left to right as 86C, 86D, 86E, 86F, 86G, 86A, 86B, 86SC, 85D, 85E, 85F, 85G, 85A, 85B, and 85C. These contact positions are meant to be contacted by the wire 10. A comparison of the musical staff 2 with the keyboard 7 will indicate that the contact position 86C of piano key 8 is the counterpart contact position to the contact position 6C in lower bass staff portion 4. In the same way, contact position 85C on the piano key 8 at the other end of the keyboard 7 is the counter-part contact position to the contact position 5C in the upper treble staff portion 3. The intermediate contact positions 86D . . . 865C . . . 85B in the piano keyboard 7 are counterpart contact positions, respectively, for the intermediate contact positions 6D . . . 6MC–5MC . . . 5B, respectively in the lower bass staff 4 and the upper treble staff 3 of the musical staff 2.

The wire leads 10 and 12 protrude through openings 9 and 11 respectively such that the lead 12 may be placed into the socket recesses representing the various contact positions of the musical staff 2 while the wire lead 10 may be placed in any of the socket recesses representing the contact positions in the piano keyboard 7. The wire leads 10 and 12 are connected in series with the bulb 13 in an energized circuit, using conveniently for this purpose a simple dry cell sufficient to light bulb 13 when the circuit is closed. A reserve length of wire lead 10 and wire lead 12 may be disposed within the panel board below the top or upper surface thereof so that upon tugging at the protruding end of the particular wire, the length of exposed wire may be increased, whereas by gripping the wire with the finger tips, portions of the same may be forced back through the appropriate openings 9 or 11 to decrease the exposed length of the wire lead, for example when the device is no longer being used. The bulb 13 may be conveniently accommodated at the top of the panel 1 in a socket connected in series with the dry cell and the wire leads 10 and 12.

FIG. 2 shows the energized main circuit 14 containing the bulb 13 and the battery 15 connected in series with the wire leads 10 and 12. The battery may take the form of any flash light battery such as a penlite dry cell, for example a size AA, #915 Eveready, using any appropriate flash light bulb therewith as the signal means. It will be appreciated, of course, that any other type of signal means may be used in place of a bulb, such a bell or a buzzer, which may be energized with a dry cell, for instance, of the foregoing type. A group of fifteen sub-circuit sections 16 are illustrated in FIG. 2, each connecting a contact point corresponding to a note 6 or 5 as the case may be with the counter-part contact point of the piano key 8. In the case of middle C, the contact points of the notes 5 and 6 in the upper treble staff portion and the lower bass staff portion are connected in series in the same sub-circuit section with the counter-part contact point middle C of the piano key 8 of the keyboard. It will be readily seen that the circuit through the light bulb 13 or other signal means is only closed so as to energize the signal means, where the wire lead 12 is placed at a particular contact point corresponding to a note in the musical staff 2 and simultaneously the wire lead 10 is placed at the contact point or position which is the counter-part thereof in the keyboard 7, these counter-part contact positions being connected by a separate sub-circuit section 16. Therefore, assuming that the directions for operating the device are followed and that the wire leads 10 and 12 are not merely crossed to light the bulb 13, such signal means 13 will only be lighted when the person using the device places the wire lead 10 at the appropriate contact position on the piano keyboard which corresponds to that in the musical scale where the wire lead 12 is placed. At no other time will the light bulb 13 be energized to give the desired signal.

Hence, the teaching device of the present invention permits the person learning music to associate visually the various note positions of the musical staff with the analogous keyboard positions of the musical instrument in question by a system of trial and error. The student may, therefore, learn the musical scale and the appropriate musical instrument note positions at his own pace, with immediate confidence and with a visual concept coupled with the mental effort of the user unattainable by devices heretofore employed. Furthermore, the user may carry the panel board without effort since the same is comparatively light, compact, and easy to hold. Where the device is especially directed toward training a child in the learning of a musical instrument, such as a piano, the top or uppermost face of the panel board may contain various bright and colorful designs attractive to children.

In FIG. 3 a specific form of circuit arrangement is shown which may be used as a back-up board behind the top panel board 1 shown in FIG. 1. In this instance, the back-up board 17 is shown which contains metallic electrically conductive strips 18 secured by suitable means, such as rivets, to the top side of board 17 and strips 19 secured in the same way to the bottom side of board 17. The various contact positions for the notes 5 in the upper treble staff and the notes 6 in the lower bass staff are shown as well as the contact positions for the counter-part piano keys 8. The strips 18 and 19 are provided on separate sides of the board 17 in order to prevent any short circuiting by overlapping contact between the separate strips.

In FIG. 3a a sectional view is shown of a portion of the board 17 to illustrate the manner in which the strips 18 and 19 are attached to the board 17. Rivet 20 passes through board 17 to secure strip 18 to the top side of board 17 while another rivet 20 is passed through board 17 to secure strip 19 to the under side thereof. Of course, at this point in the section, the upper side strip 18 has passed around the portion where the strip 19 is riveted to avoid any short-circuiting. In order to permit the particular wire lead to make conductive contact with the strip 19, board 17 is provided with a hole or aperture 22 therethrough. The adjacent positioning of the panel board 1 of FIG. 1 in abutting contact with the top side of board 17 is shown in phantom, board 1 being provided with an aperture 21 so as to define the socket recess contact position 5C therethrough for contact to be made between the wire lead 12 and the strip 18. In the same way, an aperture 21 is provided in top panel board 1 adjacent the aperture 22 in board 17 therebeneath, whereby the socket recess contact position 6C is provided which permits conductive contact between the wire lead 12 and the strip 19 through both boards 1 and 17. As will be seen from the lower portion of FIG. 3a, the lower end of strip 18 is fastened to the board 17 by rivet 20 and the appropriate area of board 1 thereover is provided with an aperture 21 so as to define the socket recess contact position 85C.

With respect to FIG. 3b, an alternate embodiment is shown in which solid head rivets 23 are employed, such that the head of each rivet represents the socket recess contact position in question. Specifically, strip 18 is riveted to the upper side of board 17 by solid head rivet 23 and the top board 1 disposed in abutting relation therewith is provided with an aperture 21 permitting the wire lead 12 to extend into the socket recess for conductive contact at the contact position 5C defined thereby. In the same way, the strip 19, on the under side of board 17, is fastened by solid head rivet 23 so that the solid head of the rivet is positioned at the corresponding aperture 21 in board 1 to define the socket recess contact position 6C thereat. It will be appreciated in this connection that the solid head rivets 23 are composed of electrically conductive material, such as metal rivets having good conductivity. In this regard, the strips 18 and 19, as well as the rivets 20 and/or 23 may be made of aluminum metal.

Concerning FIG. 3c, it is seen that the appropriate strip 18 for contact position 5C is disposed to the side of contact position 6C for the corresponding strip 19 so as to permit free access thereto, while the lower end of said strip 18 is passed back to the contact position 85C well below said contact position 6C for the same reason. Of course, as may be seen more fully in FIG. 3, the remaining strips are shaped appropriately to permit free access to the various contact positions as well.

In FIGS. 4 and 5, an alternate embodiment of the sub-circuit means is shown in which separate layers are used for various portions of the sub-circuit means in place of the single board having the conductive strips on both sides thereof as illustrated in FIGS. 3, 3a, 3b and 3c. With respect to FIG. 4, a second board 24 is provided which is to be placed in abutting relation with board 1 of FIG. 1, i.e. on the under side thereof. Board 24 is provided on a portion thereof with the discrete metallic electrically conductive strips 25 which may be made of foil material, such as aluminum foil. The aluminum foil may be adhesively bonded to the top side of second board 24 so that each strip 25 is conductively insulated from the adjacent strip thereto. The board 24 is provided with apertures 26 which also extend through portions of the strips 25 so as to expose portions of the similar metallic electrically conductive strips 34 situated on a third board 33 in abutting relation therebeneath (see FIG. 5). The aperture 27 extends through board 24 at a point in the board not covered with a strip 25 while the oblong aperture 28 extends through board 24, at a point at which no strip 25 is disposed, both apertures 27 and 28 permitting the exposure of appropriate portions of strips 34 on board 33 (see FIG. 5). In the same way the aperture 29 extends along a portion of board 24 to expose other appropriate portions of strips 34 in the third board 33 underlying the second board 24. Apertures 30 and 31 are provided in second board 24 in order to permit the wire leads 10 and 12, respectively, to pass upwardly to the top surface of board 1. In the same way the aperture 32 is provided for the socket mounting of the bulb signaling means.

It will be appreciated that strips 25 serve to connect the contact position areas 5D, 5E, 5F, 5G, 5A, 5B, and 5C, respectively, of the upper treble staff 3 with the contact positions 85D, 85E, 85F, 85G, 85A, 85B, and 85C, respectively, of the counter-part keyboard 7. On the other hand, by reason of the apertures 28, 27, and 26, corresponding strips 34 lying beneath the second board 24 serve to connect the contact position 5MC in the upper treble staff 3 as well as contact positions 6MC, 6B, 6A, 6G, 6F, 6E, 6D, and 6C, respectively, of the lower bass staff 4 with the corresponding contact positions 85C, 86B, 86A, 86G, 86F, 86E, 86D, and 86C, respectively in the counter-part keyboard 7, which latter contact positions are exposed by reason of the oblong aperture 29 in the second board 24.

With specific reference to FIG. 5, a third board 33 is shown which contains similar foil strips 34 to the foil strips 25 shown in FIG. 4. In the same way, strips 34 are discretely positioned with respect to one another so that no short circuiting is possible, the strips 34 being bonded by suitable adhesive to the top surface of the third board 33. As may be appreciated from a comparison of FIGS. 4 and 5, the contact position areas in the strips 34 of FIG. 5 are those which are exposed by reason of the apertures 28, 27, 26, as well as 29, provided in the second board 24 positioned immediately thereabove and in abutting contact therewith. Thus, it is seen that where the wire lead 12 is used to contact a particular contact position 5MC–6MC, 6B . . . 6C, the other wire lead 10 must contact the opposite end of the particular strip containing the contact position being touched by wire 12, in order to light the bulb 13. Apertures 35 and 36, respectively, are provided in board 33 for passing therethrough the appropriate wire lead 10 or 12. An aperture 37 is provided for mounting the socket 38 of the light bulb 13, and as shown in phantom, a battery holder having spring clips 40 and 41 is used to contain the dry cell 15 on the under side of the panel board arrangement. The main circuit in this case will include the wire lead 12, the dry cell 15, the wire connection 39 between the dry cell 15 and the light bulb socket 38 as well as the wire lead 10.

A comparison of FIGS. 1, 4 and 5 will indicate that the apertures 35, 30, and 9 as well as the apertures 36, 31, and 11 are superimposed so as to permit the wire leads 10 and 12 respectively, to pass upwardly through the three boards on to the top surface of panel board 1. The same construction is used with respect to the aligning of the apertures 37 and 32 to permit the bulb 13 to extend through board 1 into the socket 38.

It is preferred to provide an additional board of the same configuration as board 1 on the under side of board 33, in order to completely enclose the various parts of the apparatus and protect the same from injury and wear and tear. Suitably, a portion of the interior of such bottom board should be hollowed out or a perimeter frame spacing member should be used between board 33 and the bottom board. This will enable the wire leads 12 and 10 to be disposed in random manner in the hollow space beneath board 33 so that a reserve length of wire is present which may be brought through apertures 9 and 11, as the case may be, where more exposed wire is required, and alternatively, excessive lengths of exposed wire may be shortened by grasping the particular wire and forcing it back through the aperture into random disposition in the hollow space. While such bottom board and/or spacing frame which defines such hollow space are not shown, the construction thereof is notoriously old. Of course, as the depth or thickness of the composite panel board containing the various board layers increases, a greater portion of the dry cell 15 may be accommodated in a suitable recess passing upwardly through the various board layers. Any exposed portion of the dry cell may be suitably covered by a metal or plastic lid or merely closed off with a piece of adhesive tape which may be readily removed for changing the dry cell. Where no such recess is provided in the various layers for receiving all or a portion of the dry cell and its holder, the same may be covered on the exposed portions with suitably dimensioned metal or plastic lids or covers and/or adhesive may be used in this regard as well.

The board 17 of FIG. 3, the boards 24 and 33 of FIGS. 4 and 5, and even the board 1 of FIG. 1 may be made of any suitable material, such as cardboard or plastic sheet material having structural stability and solidity sufficient to maintain the various parts in the desired positional relationship, at least when the various board layers are superimposed in congruent disposition and secured to one another. The conductive strips 18 and 19 of FIG. 3 may take the form of conductive wires or prestamped metal foil sections which may be suitably attached, as for example by rivets, to the board 17. Furthermore, printed circuits may be used to form the various sub-circuits so long as the sub-circuits maintain the relationship shown in FIG. 2 and connect properly the contact positions of the musical staff with those of the keyboard.

In the case of the metallic foil used in the embodiment of FIGS. 4 and 5, the same may be suitably bonded to the cardboard or plastic strip by any paper and/or metal cement, or as in the case of the embodiment of FIG. 3, the metal foil strips may be riveted or otherwise mechanically secured to the underlying board. If desired, a sheet of metal foil may be disposed onto the board in question and thereafter a punch or stamp may simultaneously form the apertures in the board and in the metallic foil, such as aluminum foil, and at the same time sever the sheet of foil material into adjacent strips of the desired shape indicated in FIGS. 4 and 5. More simply, a sharp edge or pointed tool may be used to score the foil sheet already bonded to the board, whereby the foil sheet is cut along the score line so as to completely separate the various strip portions without the cut passing entirely through the board.

In accordance with a preferred form of execution, a cardboard layer 1 may be used having 11 x 15" dimensions and a thickness of about $1/16"$. The cardboard upper layer may contain printed matter thereon representing the desired indicia described in connection with FIG. 1, in which event an artboard preferably will be used, or else a less expensive cardboard or plastic board may be employed containing a paper sheet bonded to the upper surface thereof, said sheet containing the desired indicia and representations. In connection with FIG. 3, the board 17 may be of cardboard or plastic and may have a similar over-all 11 x 15" dimension with a thickness of about 1/16". A bottom board layer may be used on the under side of board 17, composed of similar material having a similar thickness.

Where the embodiment of FIGS. 4 and 5 is concerned, the separate 2nd and 3rd board layers may be about 1/32" in thickness, both boards preferably having the same edge dimensions of 11 x 15".

The over-all thickness of the composite panel board will be preferably less than 1/4" although depending upon the thickness of the various layers and the inclusion of a spacer frame and/or hollow space in the bottom board, increased thicknesses of the composite panel board may be used. Generally, the over-all dimension of the entire panel board thickness will be between about 1/16 and 1/2", save for any protruding dry cell portions located on the under side of the composite board. More particularly, each of the boards making up the various layers may range between about 1 mm. and 1/8" in thickness, i.e., 0.04–0.125". On the other hand, the aluminum foil or other metallic conductive material may be between 0.1 and 1 mm. in thickness. Preferably, in connection with the embodiment of FIGS. 4 and 5, the top layer 1 will have a thickness of 1/16" while the second and third layers 24 and 33 will each have a thickness of 1/32". If a bottom covering layer is used to enclose the reserve portions of the wire leads, such bottom layer may have a similar thickness to that of the second and third layers or the top layer, and the central portion thereof may be hollowed out in one face to receive the wire leads or else a spacer frame having a similar outside dimension as the remaining layers may be employed with a thickness generally ranging between 1/32 and 1/4" as desired.

It will be appreciated that while the instant drawings are specifically directed to a panel board for learning the piano, the same theory may be applied to any musical instrument which lends itself to a visual comparison between the note positions on the instrument and the note positions on an appropriate musical staff. Outside of the related instruments, such as the organ, accordion, etc., the panel board of the present invention may be used for teaching the trumpet, trombone, etc.

With specific reference to the piano, it has been found that young students, between the age group 5–10 years, and more especially 3–10 years, have been able to advance in learning to such an extent that the teaching of piano fundamentals may be condensed into as short a period as six months and even three months in accordance with the invention, whereas by the usual methods, employing a piano, periods of 6 months as opposed to 3 months, or a year and longer as opposed to six months would be necessary to accomplish the same result. The advantage of the invention is that the student is able to associate visually the note positions on the musical staff with the piano keys of a keyboard, or with the note positions on any musical instrument lending itself to the visual concept of association, whereby without the necessity for having the actual musical instrument, the note positions thereof may be learned in association with the note positions on the particular musical staff involved.

As noted above, the learning time may be decreased up to 50% where the device of the invention is employed instead of the usual teaching methods, depending upon the degree of maturity and innate learning ability of the young child. It will be appreciated that in the normal instance, for a beginner to learn successfully the rudiments of playing a musical instrument, such as a piano, in addition to the required supervised music instruction, the student must study his lessons at home and memorize the notes of the musical scale and their relation to the musical instrument, e.g. the piano keyboard. With respect to comparatively young students, for instance those 3 and 4 years of age, such home study without supervision by the piano teacher is often boring and far from enjoyable. By utilizing the panel board device of the invention, such otherwise tedious and dry study may be transposed into fun and amusement for the child with immediate confidence being engendered as the bulb lights up indicating a correct placement of the wire leads at the corresponding note and keyboard contact positions. Thus, a chore becomes a game of amusement for the child which can be played without close supervision, yet with the homework lessons being learned quickly and with a favorably positive mental attitude toward the study of music. Such advantages are especially important with young children, whereby a three year old may learn the fundamental note and piano keyboard positions in as little as three months with proper study and home practice. Naturally, a child will be much more confident, mentally equipped and favorably attitudinized for further study where these fundamentals of music are comparatively quickly, easily and fully learned as is possible with the panel board device of the invention.

While the present invention has been described with respect to preferred features and embodiments, it will be understood that various modifications may be made in the construction disclosed without departing from the spirit and scope of the present invention which is to be limited only by the scope of the appended claims.

What is claimed is:

1. Portable and compact visual aid identification device for learning without supervision the fundamental positional correlation between respective notes of a musical staff and corresponding keys of a piano for sounding such notes when the piano is played, which comprises a panel board having a visual representation of a musical staff with individual notes depicted thereon on one face of the panel board and a visual representation of at least a portion of a piano keyboard with simulated individual piano keys for achieving such notes depicted thereon on said face, an energizable circuit means containing an electrically operable signal means therein and having a pair of contact terminal leads for closing said circuit means to operate said signals means, a plurality of musical staff contact positions for one of said leads each disposed on said face at a corresponding note and a plurality of piano key contact positions for the other of said leads each disposed on said face at a corresponding simulated piano key, and a plurality of sub-circuit means each connecting a respective musical staff note contact position with the corresponding piano key contact position for closing the circuit means to said signal means only when one of the leads is placed at a respective musical staff note contact position and the other of the leads is placed simultaneously at a corresponding counter-part piano key contact position connected by the same sub-circuit means, said musical staff including an upper horizontally disposed treble staff portion depicting from left to right in ascending order the respective notes middle C, D, E, F, G, A, B, and high C, as well as a lower horizontally disposed bass staff portion correspondingly positioned directly below said upper treble staff portion in parallel relation therewith and depicting from left to right in descending order the respective notes middle C, B, A, G, F, E, D, and low C, and said piano keyboard including a plurality of piano keys depicting from left to right in ordinal sequence by designating indicia the respective counter-part piano scale notes low C, D, E, F, G, A, B, middle C, D, E, F, G, A, B, and high C, said keyboard being horizontally disposed directly below said staff in spaced parallel relation thereto, the contact positions of the piano key scale notes of the sequence low C, D, E, F, G, A and B being series connected respectively by separate sub-circuit means with the corresponding contact positions of the counter-part lower staff notes of the sequence low C, D, E, F, G, A and B, the contact positions of the piano key scale notes of the sequence D, E, F, G, A, B and high C being series connected respectively by separate sub-circuit means with the corresponding contact positions of the counter-part upper staff notes of the sequence D, E, F, G, A, B and high C, and the contact position of the piano key scale note middle C being series connected by a common sub-circuit means with the corresponding contact positions of both the counter-part lower and upper staff notes middle C.

2. In the visual aid method of association-identification for learning without supervision correlation between respective notes of a musical staff and corresponding keys of a piano for sounding such notes when a piano is played, by operating a device including a panel board having a visual representation of a musical staff with individual notes depicted thereon on one face of the panel board and a visual representation of at least a portion of a piano keyboard with simulated individual piano keys for achieving such notes depicted thereon on said face, an energizable circuit means containing an electrically operable signal means therein and having a pair of contact terminal leads for closing said circuit means to operate said signal means, a plurality of musical staff contact positions for one of said leads each disposed on said face at a corresponding note and a plurality of piano key contact positions for the other of said leads each disposed on said face at a corresponding simulated piano key, and a plurality of sub-circuit means each connecting a respective musical staff note contact position with the corresponding piano key contact position for closing the circuit means to said signal means normally only when one of the leads is placed at a respective musical staff note contact position and the other of the leads is placed simultaneously at a corresponding counter-part piano key contact position connected by the same sub-circuit means; the improvement which comprises operating such device, for learning the fundamental positional correlation between respective notes of a musical grand staff and the corresponding keys of a piano for sounding such notes when a piano is played, with such a musical staff representation which includes an upper horizontally disposed treble staff portion, of the grand staff, depicting from left to right in ascending order the respective notes middle C, D, E, F, G, A, B, and high C as well as a lower horizontally disposed bass staff portion, of the grand staff, correspondingly positioned directly below said upper treble staff portion in parallel relation therewith and depicting from left to right in descending order the respective notes middle C, B, A, G, F, E, D, and low C, and such a piano keyboard representation which includes a plurality of piano keys depicting from left to right in ordinal sequence by designating indicia the respective counter-part piano scale notes low C, D, E, F, G, A, B, middle C, D, E, F, G, A, B, and high C, said keyboard being horizontally disposed directly below said grand staff in spaced parallel relation thereto, the contact positions of the piano key scale notes of the sequence low C, D, E, F, G, A and B being series connected respectively by separate sub-circuit means with the corresponding contact positions of the counter-part lower staff notes of the sequence low C, D, E, F, G, A and B, the contact positions of the piano key scale notes of the sequence D, E, F, G, A, B, and high C being series connected respectively by separate sub-circuit means with the corresponding contact positions of the counter-part upper staff notes of the sequence D, E, F, G, A, B, and high C, and the contact position of the piano key scale note middle C being series connected by a common sub-circuit means with the corresponding contact positions of both the counter-part lower and upper staff notes middle C, whereby the learner-operator will learn correctly and with confidence by trial and error association-identification of the respective notes and keys and the fundamental positional correlation and relationship between the individual notes of the upper treble staff portion of the grand staff and the particular corresponding treble keys of the piano keyboard and between the individual notes of the lower base staff portion of the grand staff and the particular corresponding bass keys of the piano keyboard, in consequence of rewarding signals emitted by the signal means upon proper positioning of the terminal leads at the corresponding counter-part note and key contact positions.

References Cited in the file of this patent
UNITED STATES PATENTS
1,400,947    Fennell _____ Dec. 20, 1921